April 17, 1956　　　D. H. CASTLE　　　2,741,859
COIN OPERATED FLUSH MOUNTED VEHICLE BARRIER
Filed June 21, 1951　　　　　　　　　　　5 Sheets-Sheet 1

INVENTOR.
DONALD H. CASTLE
BY J. G. Grier
ATTORNEY

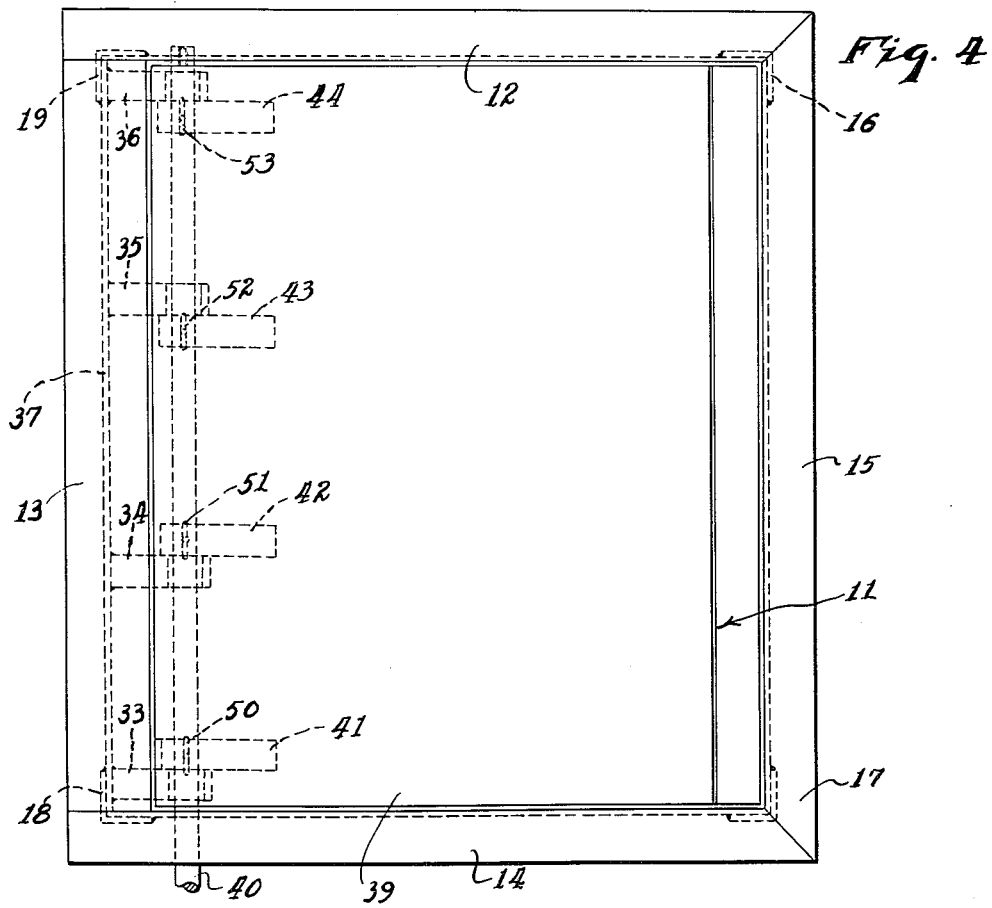
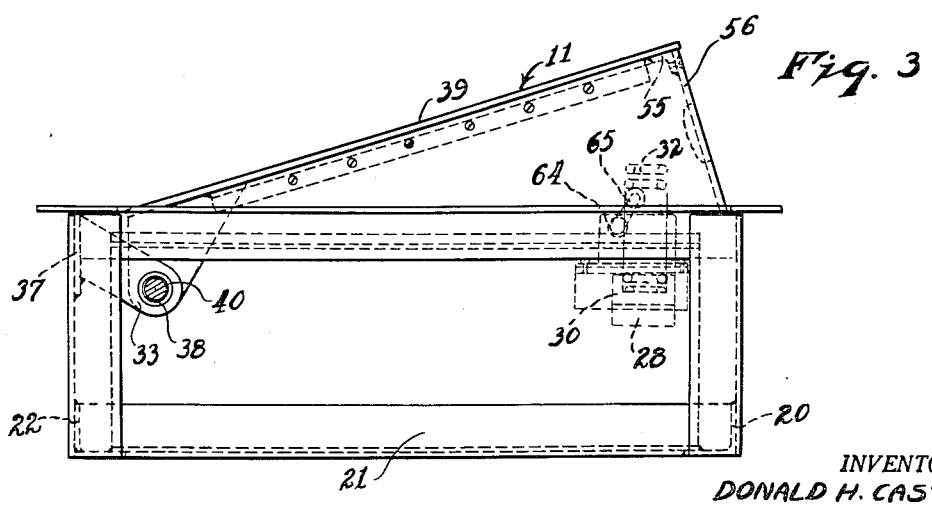

April 17, 1956 D. H. CASTLE 2,741,859
COIN OPERATED FLUSH MOUNTED VEHICLE BARRIER
Filed June 21, 1951 5 Sheets-Sheet 3
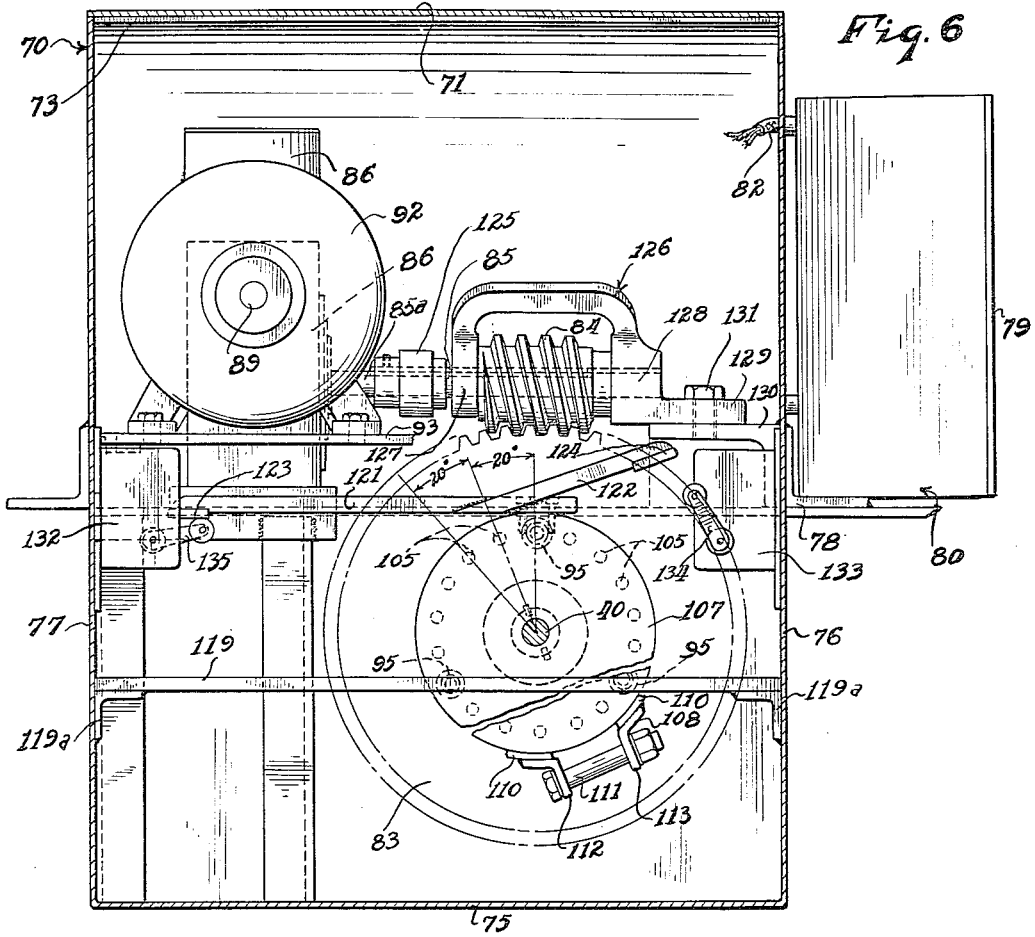
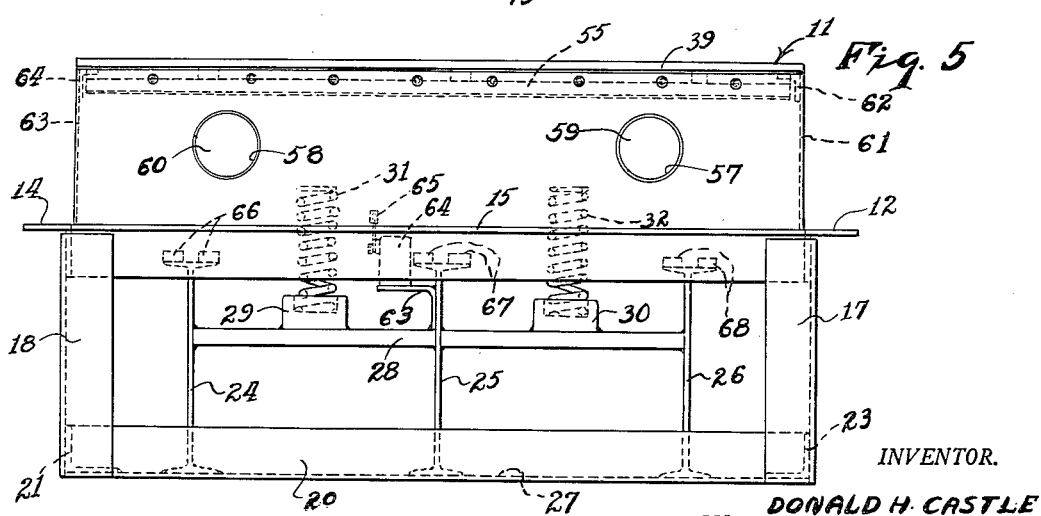
INVENTOR.
DONALD H. CASTLE
BY J. A. Grier
ATTORNEY April 17, 1956  D. H. CASTLE  2,741,859
COIN OPERATED FLUSH MOUNTED VEHICLE BARRIER
Filed June 21, 1951  5 Sheets-Sheet 4
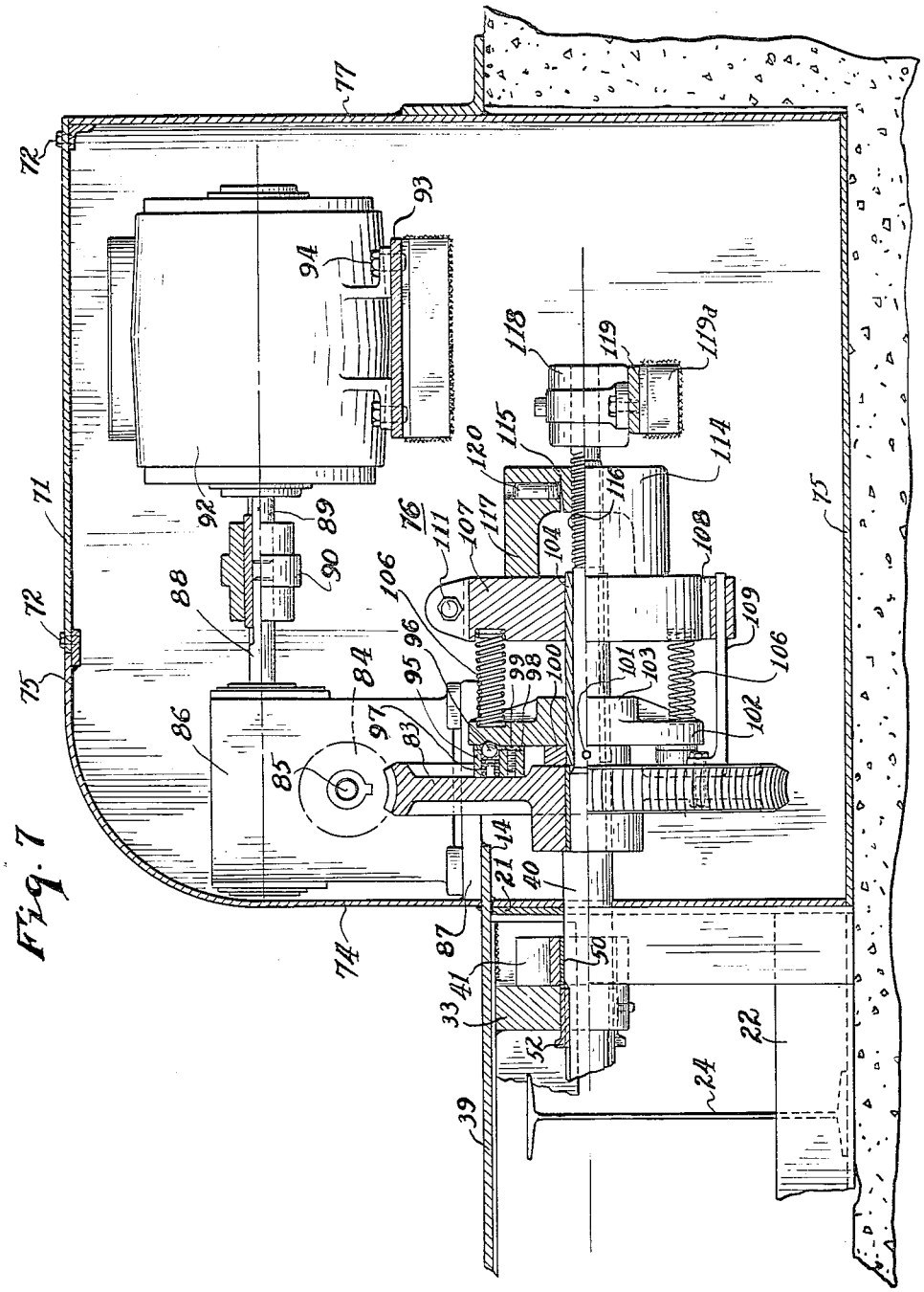
INVENTOR.
DONALD H. CASTLE
BY J. A. Grier
ATTORNEY

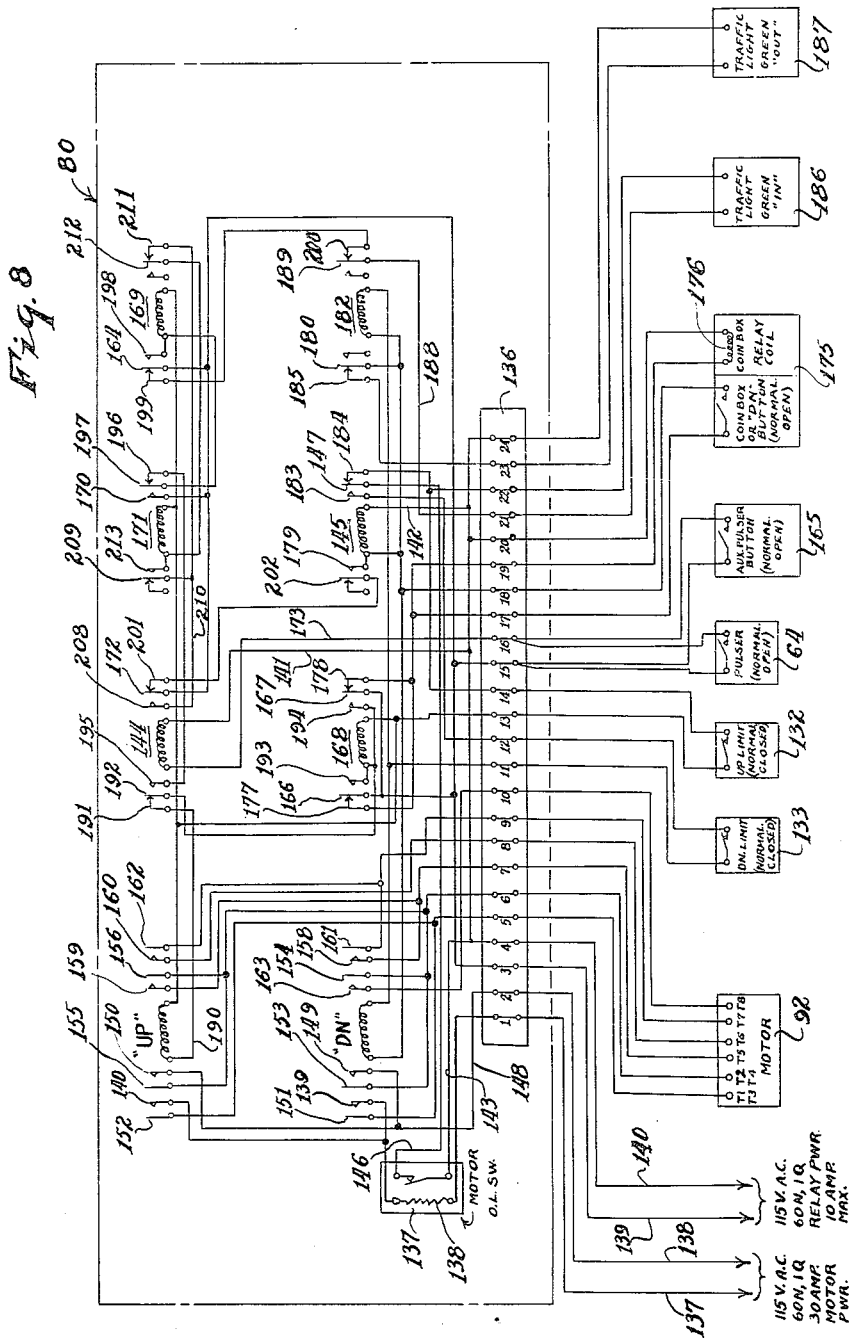

United States Patent Office 2,741,859
Patented Apr. 17, 1956

2,741,859
COIN OPERATED FLUSH MOUNTED VEHICLE BARRIER

Donald H. Castle, New Canaan, Conn., assignor to Richard H. Hallsted, New Canaan, Conn., as trustee Application June 21, 1951, Serial No. 232,769

4 Claims. (Cl. 39—6)

This invention relates to improvements in coin operated flush mounted vehicle barrier and has for an object the provision of an improved parking system embracing an area into which any vehicle may freely enter, but in which each vehicle is prevented from leaving said area until a barrier means is displaced by a coin controlled means within easy reach of the driver of the vehicle as it approaches the barrier means with the view of leaving said area.

This application is a continuation in part of application Ser. No. 90,132, filed April 28, 1949 by Glen S. Stratton, now Patent No. 2,637,920, dated May 12, 1953, wherein the mechanism, of which the barrier means in an element, has been substantially improved, and in which the controls have also been improved. Other objects and advantages of the invention will be apparent to those skilled in the art upon a study of this specification and the accompanying drawings.

Referring to the drawings which are given by way of example to illustrate the invention:

Figure 3 is a side elevation of the casing which supports the barrier means;

Figure 4 is a plan view of the casing containing the barrier means;

Figure 5 is an elevation of the barrier assembly as seen from the right side of Figure 3;

Figure 6 is a sectional elevation of the compartment containing the mechanism, and showing motor driven mechanism for controlling the barrier means;

Figure 7 is an elevation partly in section showing the motor driven drive mechanism and features of the mechanism to be presently described; and Figure 8 is a circuit diagram showing the electrical circuits for supplying power to and for controlling all phases of operation of the mechanism.

Figure 1:
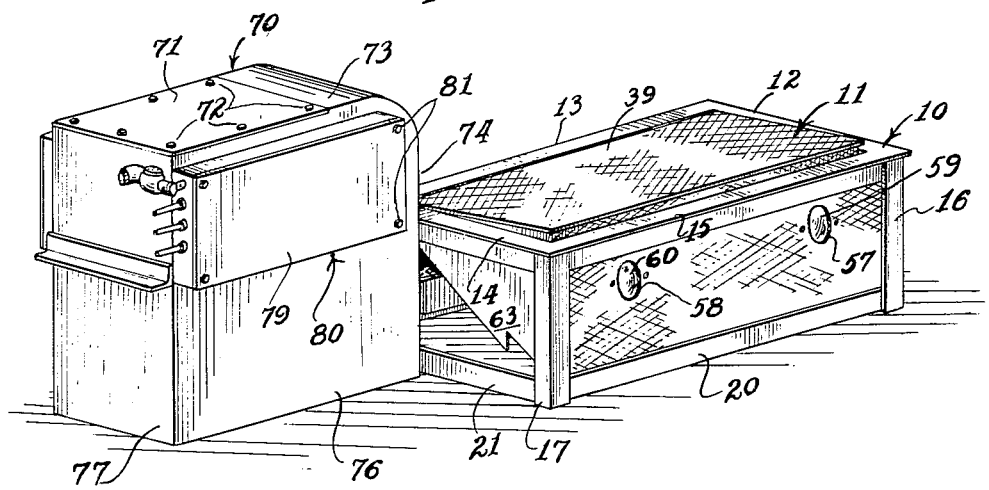
Figure 1 is a perspective view of the new and improved mechanism wherein the barrier means is mounted in a casing which when installed is substantially level with the pavement, and the motor and some of the mechanism and some of the controls are mounted in a casing which when installed is partially set into the ground, a large portion thereof remaining above the surface thereof.
Figure 2:
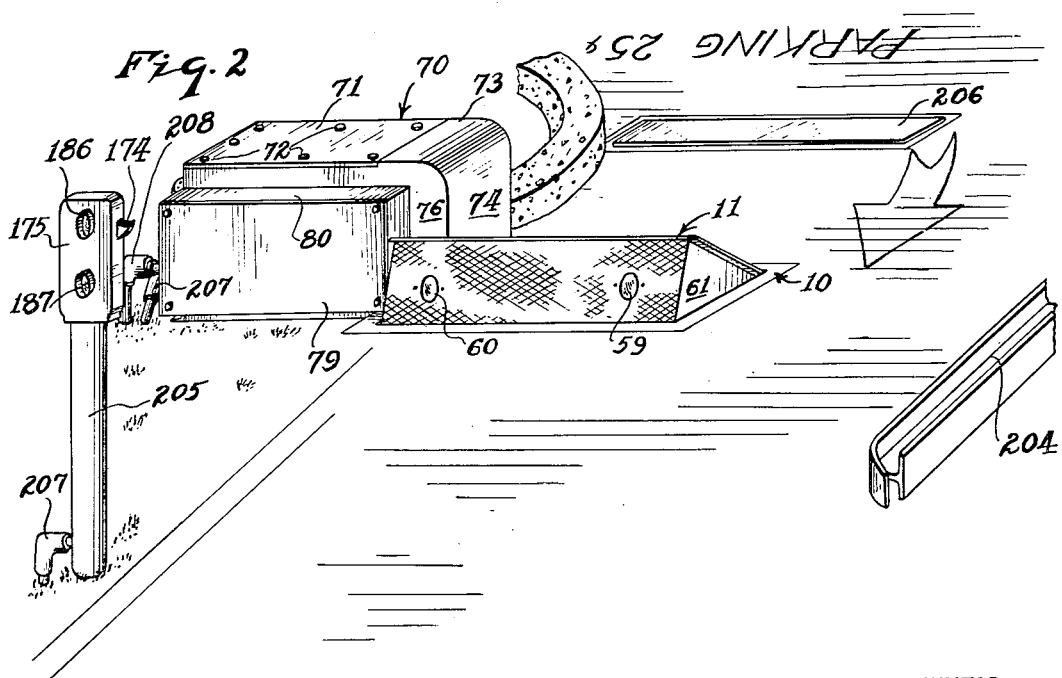
Figure 2 is a perspective view showing the two units of Figure 1 installed as a two-way gateway to a parking area.

Referring first to Figures 1 and 2, in the new and improved mechanism, portability and ease of installation are paramount features. The casing 10 containing the barrier member 11 consists of a rectangular frame formed of angle irons 12, 13, 14, and 15 at the top and with corner members 16, 17, 18 and 19 which are joined to said top and to base members 20, 21, 22, and 23. Disposed in spaced relation within the frame just described are I beams 24, 25, and 26 which are secured to a base plate 27, for example, by welding. Secured to I beams in spaced relation to the base 27 is a support plate 28 which carries spaced sockets 29 and 30 into which the lower ends of springs 31 and 32 respectively are mounted. These features may be best seen in Figure 5.

Referring now to Figures 3 and 4, a series of lugs 33, 34, 35, and 36 are welded onto a bridging strip 37 which is secured in the frame above described. Each of these lugs has a bearing hole therethrough containing a bearing bushing 38. Since all of these bushings are alike, they are all given the same numeral and the holes in the lugs into which these bushings are pressed are all in axial alignment and have a shaft 40 journaled therein. Secured to the under surface of the top plate 39 of the barrier means 11 are lugs 41, 42, 43, and 44. These lugs are welded to said under surface and have aligned holes therethrough which have keyways formed therein which engage keys, such as the keys 50, 51, 52, and 53 carried by the shaft 40. The barrier means 11 has an angle iron 55 adjacent to the right edge as seen in Figure 3, and secured to this angle iron, flush with the top plate, is a depending plate 56 which forms a closure for the open end of the framework 10. The plate 56 has a pair of spaced holes 57 and 58 formed therein and contains bull's-eyes 59 and 60 respectively. Depending from the right end of the top plate 39 is a closure plate 61 which is supported by an angle iron 62 secured to the top plate 39. On the left end a similar closure plate 63 is provided and this plate is supported by an angle iron 64 secured to the under surface of the plate 39 at the left end thereof as seen in Figure 5.

Secured to the I beam 25 and to the upper surface of the plate 28 is an angled bracket 63 upon which is secured a pulsing switch 64 which is actuated by the engagement of the barrier 11 with a lever 65 on the switch 64. The I beams 24, 25, 26 have, respectively, pairs of metallic blocks 66, 67 and 68 secured to the upper surfaces thereof which forms stops for arresting the barrier when other controls fail and allow the barrier to move to a point where it contacts said blocks.

Referring now to Figures 1, 6, and 7, a second casing 70 is provided with a removable plate 71, which is secured thereon by means of screws 72, which provides access to the interior of the casing in case adjustments or repairs are necessary. This casing has an extension 73 of its top wall curved around to form an end wall 74. The casing has a bottom plate 75 to which all of the side and end walls are joined. A side plate 76 joins the bottom plate 75 and the end plate 74 and it also joins an end plate 77. A bracket 78 secured to the wall 76 of the casing 70 forms a support for an elongated casing 80. This casing has a closure plate 79 which is secured thereon by screws 81. This plate may be removed to gain access to a number of relays which will be described in connection with Figure 8. Connections between different elements are effected through conductors of a cable 82.

Referring now to Figure 7 the shaft 40 extends from the structure 10 into the casing 70. This shaft has thereon a worm gear 83 which meshes with a worm 84 carried on the shaft 85 of a gear reduction unit 86. The gear reduction unit is secured on a support 87 which is in turn supported by an extension of the plate 14.

The gear reduction unit 86 has a shaft 88 extending therefrom which engages a flexible drive coupling 90. A shaft 89 of an electric motor 92 also engages this flexible drive coupling 90. The motor 92 is secured to a bracket 93 which is mounted on the wall 76 of the casing 70. Cap screws 94 extend through feet on the motor and threadedly engage holes in the bracket 93. Secured on the worm wheel 83 are a plurality of bosses 95 one of which can best be seen in Figure 7. Each boss carries a ball 96 which is urged outwardly by means of a spring 97. Each ball is retained in its boss by a plate 98 which has an aperture therein through which a portion of the ball projects and this ball is secured to the boss by means of a screw 99. There are three such bosses spaced 120° apart and each of the other two are identical with the one described above. Consequently they are all given the same numeral. A collar 100 is secured to the shaft 49 in any suitable manner, for example, by means of a taper pin 101.

A disc 102 has a hub 103 formed integral therewith and this disc is keyed to the shaft 49 by means of a key 104. The disc 102 has a plurality of sockets 105 formed therein, any of which are adapted to be engaged by the balls 96. A plurality of springs 106 urge the plate 102 toward the left as seen in Figure 7 so that the balls 96 engaging sockets 105 will withstand considerable force before the worm wheel 83 and the plate 102 can move relative to one another. A drum 107 also has a keyway which engages the key 104. This drum is, in fact, a brake-drum which is embraced by a brake-band 108 which is engaged by a fixed arm 109 which is mounted on the worm gear 83. The brake-band 108 has a facing 110 of suitable brake material and is set by means of a bolt 111 passing through lugs 112 and 113 which form integral parts of the brake-band 108. A cylindrical member 114 has a head 115 which is threaded to match threads 116 formed on the shaft 40 and has an annular portion 117 which abuts the brake-drum 107. A bearing 118 secured to a bracket 119 on the side wall 76 forms an outboard bearing for the shaft 40. The cylindrical member has a radial clamping screw 120 which may be loosened when it is desired to move the cylindrical member along the threads 116 for tightening or loosening the tension of the springs 106. This makes a very convenient arrangement for adjusting the tension of the springs 106 which impose pressure on the disc 102 and consequently on the engagement of the balls 96 with the sockets 105. When a desired adjustment has been obtained, it may be retained by tightening the screw 120.

Referring again to Figure 6, the worm wheel 83 has secured thereto an arm 121 and a second arm 122. The arm 121 has a shoe 123 thereon, and the arm 122 has a shoe 124 thereon. The shaft 85 which the worm 84 forms an extension of a shaft 85a extending from the gear reduction unit 86 and a flexible coupling 125 is provided between the shafts 85 and 85a. The worm 84 is retained against end play by mounting it within a yoke 126 having an opening substantially equal to the length of the worm and having aligned bearings 127 and 128 therein for the shaft 85. The yoke has a lug 129 formed integral therewith and this is bolted to a bracket 130, secured on the wall 76, by means of cap screws 131.

The arm 121, see Figure 6, when the worm wheel 83 moves in a counter-clockwise direction through an angle of 20°, engages a lever 135 on the "up" limit switch 132. When the worm wheel 83 moves in the opposite direction, that is to say, clockwise, as seen in Figure 6, the arm 122 engages the lever 134 on the "down" limit switch 133. The elongated relay casing 80, Figures 6 and 8, contains a connection strip 136 with twenty-four terminals thereon. Conductors 137 and 138 lead from a source of power to terminals numbers 1 and 2 respectively to the connection strip 136. Conductors 139 and 140 lead from another source of power or the same source of power to terminals numbers 3 and 4 on the connection strip 136. Conductors lead from the terminals of the motor 92 designated as T1, T2, T5, T6, T7, and T8 to terminals numbers 5 to 10 inclusive on the connection strip. A motor overload switch 137 has an actuating coil 138, one end of which is connected to the terminal number 1 on the strip 136 and the other end is connected to a contact 139 on a "DN" relay and to the terminal 140 on an "UP" relay. The overload switch includes contact arms, one of which is connected via a conductor 143 to terminals numbers 4, 20, and 24 on the strip 136, and branch conductor's 141 and 142 therefrom lead respectively to actuating coils in relays 144 and 145. The other contact arm in the motor overload switch is connected via a conductor 146 to a contact arm 147 in relay 145. A conductor 148 leads from terminal number 2 on the strip 136 to contact arm 149 in relay "DN" and to contact arm 150 in relay "UP."

The motor terminals T1 and T3 are connected to terminal number 5 on the strip 136 as pointed out above and a conductor leading from terminal number 5 is connected to contact arm 151 in relay "DN" and also to contact arm 152 in relay "UP." Terminal number 6 on the strip 136, which leads from motor terminals T2 and T4 is connected via a conductor to contact arms 153 and 154 in the relay "DN" and to contact arms 155 and 156 in the relay "UP." Terminal number 7 which is connected to a motor terminal T5 is connected via a conductor to contact arm 158 in relay "DN" and to contact arm 159 in relay "UP." Terminal number 8 which is connected to motor terminal T6 is connected via conductor to contact arm 160 in relay "UP." Terminal number 9 on the strip 136 which is connected to the T7 on the motor is connected to the contact arm 161 in relay "DN" and to contact arm 162 in relay "UP." Terminal #10 which is connected to terminal T8 on the motor is connected to relay contact arm 163 of relay "DN." The pulsing switch 64 which contains push-button contacts that are normally open is connected to terminals 15 and 16 on the strip 136 and these are also bridged across contacts in an auxiliary pulser 165. The terminal 15 is connected to terminal number 3 on the strip, to contact arms 166 and 167 of a relay 168 and to contact arm 164 in relay 169, to contact arm 170 in relay 171 and to contact arm 172 of relay 144. The terminal 16 is connected via a conductor 173 to the other end of the winding of the relay 144 so that when the pulser 64 is closed, current is delivered from the second mentioned source of current to one side of the winding 144, then through the winding and via the conductor 173 to the terminal number 16, across through the pulser 64 to terminal 15 and thence to terminal number 3, which is the other side of the second source of current. Above it was mentioned that the two sources of current referred to could be one single source. However, it was found preferable to furnish heavy current for the motor from one source and the lighter volume of current from another source for operating the relays, etc. A coin box 175 which receives coins via the coin slot 174 has a pair of contacts which are actuated by coins and it has a relay winding 176 which renders the coin box inoperative and returns coins if the main power supply fails. The contacts are connected to terminals numbers 17 and 18 on the strip 136, and a conductor lead from the terminal 17 is connected to the contact points 177 and 178 of relay 168 and is also connected to the terminal number 19 on the terminal strip which leads to one end of the winding of the coin box relay 176. The other end of this relay winding is connected to terminal strip number 20 which, as described above, is connected to terminal number 4, to a contact arm in the motor overloading switch, to one end of the relay winding 144, to the winding of the relay 145, and to terminal strip number 24 which will presently be described. The terminal number 18 connects to one end of the winding of the relay "DN"; it connects to the other terminal of the relay winding 145 and, in turn, to the contact arm 179; it connects to contact arm 180 of relay 182 and to one end of the winding of the relay 182. The "down" limit switch 133 which is normally closed has its terminals connected to terminals numbers 11 and 12 on the strip 136. The terminal 11 connects to one end of the winding of the relay "DN," to one end of the winding of the relay 182. Terminal number 12 is connected to contact arm 183 of relay 145.

The "UP" limit switch 132 has two contacts which are connected to contacts numbers 13, and 14 on the strip 136. Terminal number 13 connects to one end of the winding of the relay 168, and to one end of each of the windings in the relays "UP" 144, 171, and 169. Terminal number 14 connects to terminal number 22 and to contact arm 184.

A traffic light 186 which gives the green light to vehicles which desire to enter the parking area, and a traffic light 187 which is provided for giving the green light to vehicles which desire to leave the parking area, are both controlled by the coin control. The traffic light 186 is connected to terminals numbers 21 and 22 on the terminal strip 136, and the traffic light 187 is connected to terminals numbers 23 and 24. Terminal number 21 is connected via a conductor 188 to contact arm 189 of the relay 182. Terminal number 22 is connected to contact arm 184 and also to contact number 14 on the terminal strip 136. The other end of the winding of the "UP" relay is connected via a conductor 190 to a contact arm 191 of relays 144 and a contact arm 192 which cooperates therewith, is connected to one end of the winding of the relay 168 and to a contact arm 193 in this relay and also to a contact arm 194 therein.

A contact arm 195 of relay 144 is connected to a contact arm 196 of relay 171 and cooperating with this contact arm is a contact arm 197 which is connected to the winding of relay 169 and to contact arm 198 of this relay. Contact arm 199 of this relay which cooperates with the contact arm 164 is connected to contact arm 200 of relay 182. Contact arm 201 of relay 144 is connected to contact arm 202 of relay 145. A contact arm 208 which cooperates with contact arm 172 when relay 144 is energized is connected via a conductor 210 to contact arm 209 of relay 171 and to contact arm 211 of relay 169. Contact arm 212 of relay 169 is connected to one terminal of the winding of relay 171 and also to a contact arm 213 therein.

Figure 2 shows my new and improved control system installed at the entrance and exit of a parking lot which is to be coin controlled. The casing 10 containing the barrier and certain supports and mechanism therein is set flush with the surface of the roadway and is normally in the position shown in Figure 2, the foreground of this figure, but part of the parking area and the background is the area from which cars that desire to park approach the parking area. From the background, a vehicle drives in between the mechanism casing 70 and a guard rail 204. Due to the presence of the rail 204, the right front and rear wheels of the vehicle depress and pass over the barrier 11. Therefore the vehicle may freely enter the parking area provided the traffic light 186 on the coin receptacle 175 shows green in its direction. This would be the case at all times unless the parking area is filled. The coin box 175 is mounted on a column 205 at a convenient height to be easily reached by the driver of any vehicle which desires to leave the parking area. As a vehicle approaches the barrier 11 he will be warned of its presence by the reflecting bull's-eyes 59 and 60 so he brings the vehicle to a stop and inserts a quarter into the coin slot 174. This causes the traffic light 186 to show red toward the background of Figure 2 and the traffic light 187 shows green in the depositor's direction, indicating that he is free to go ahead. The mechanism described herein moves the barrier 11 down to a horizontal position and the left hand wheels of the vehicle roll over this barrier so that the weight of the front wheel of the barrier causes the pulser 64 to momentarily close and institute a pulse which results in the retaining of the barrier 11 in the depressed position until the rear wheel of the vehicle rolls over the barrier, whereupon a second pulse is initiated in the pulser 64 to cause the mechanism to reset and assume its normal position as will hereinafter be described.

In Figure 2 is shown a treadle 206 which operates to cause the barrier 11 to recede under the power of the motor, thereby eliminating the weight of the vehicle for depressing the barrier. However, this forms no part of the present invention and will be presented in a subsequent application. The conduit 207 and 208 are provided for leading conductors from the column 205 and into the relay casing 80.

Reference to Figure 8 shows the following important features:

1. Two power sources are connected to the main terminal board 136. The first, connected to terminals 1 and 2 provides power, as controlled by the relay system, to operate motor 92 which drives the barrier plate 11 up and down. The second source connected to terminals 3 and 4 provides power for the relays themselves. The two sources are shown separated so that the severe current drain of the motor as it starts and runs cannot adversely affect the operation of the relays.

2. The main motor 92 which drives the barrier plate up and down as required.

3. A "down" limit switch 133 which opens when the plate is in "down" position to permit passage of a car.

4. An "up" limit switch 64 which opens when the plate is at rest in its normal raised position.

5. A pulser switch 56, normally open, even when the plate is in the "down" position; but which is caused to close as the weight of the car wheel depresses the plate below the normal "down" position.

6. An auxiliary pulser button 165 which duplicates the effect of a car wheel to cause the barrier plate to rise.

7. A coin box 175 with associated relay coil 176 which makes the coin box inoperative and returns coins if main power fails.

8. Two traffic lights 186 and 187 which indicate to the driver when to proceed in either direction across the barrier plate 11.

Normally the barrier plate is raised, and it is assumed that a car is ready to enter the parking area. The green in-traffic light 186 is lighted, indicating that a car may enter the area. No relays are operated except coin box relay coil, the function of which will be presently described.

The vehicle starts to enter, forcing the barrier plate 11 down with its front wheel. As the barrier lowers, "up" limit switch 132 closes and "down" limit switch 133 opens, and finally pulser switch 64 closes as the plate is depressed below its normal "down" rest position. The closing of pulser switch 64 causes relay 144 to operate from relay power. Relay 144 stays operated as long as the car wheel is on the barrier plate and, in turn, causes relay 171 to operate through the closing of contacts 208 and 172 of relay 144. Operation of relay 171, in turn, causes relay 169 to operate, through contacts 170 and 197 of relay B. Relays 144, 171 and 169 remain operated as long as the front wheel of the car keeps pulser switch 64 closed. As soon as the front wheel of the car leaves the barrier plate, relays 144 and 171 drop. The circuit discloses that these two relays are held operated through the pulser switch 64. Relay 169 however remains operated through its own contacts 164 and 198; and therefore has "counted" the first wheel of the car. In addition, the green in-traffic light 186 has been extinguished since its power is fed through contacts 164 and 199 of relay 169 which are now opened.

As the second or rear wheel of the car presses the plate down and closes pulser switch 64, contact 195 of relay 144, now energized from relay 169 through contacts 196 and 197 of relay 171, will cause relay 168 to operate when pulser relay 144 again operates. Relay 168 will now operate and therefore "count" the second or rear wheel of the car. However, relay 168 will only provide a power connection to contact 192 of relay 144 through contacts 166 and 193 of relay 168, with the following result: When the car wheel leaves the plate 11, pulser switch 64 opens, relay 144 resets, and the "UP" relay operates from contacts 191 and 192 of relay 144. The "UP" relay, through its contacts causes the main motor 92 to drive the barrier plate 11 upwardly. As soon as the barrier plate reaches its uppermost position, the "UP" limit switch 132 opens and causes all operated relays, "UP," 169, and 168, to reset. When relay 169 resets, power is again connected to the green in-traffic light 186, and the system is normal again, ready for vehicles to enter or leave.

Any vehicle entering the area would cause a repetition of the same operating cycle; however, when a motorist wishes to drive out of the area, a slightly different procedure is involved. The driver, who must pay the required fee as he leaves, deposits the coin in coin box 175 causing the coin box switch to close momentarily as the coin drops. This in turn causes relay 145 to operate and stick through its own contacts 179 and 202 and through contacts 172 and 201 of relay 144, which are closed. Relay 182 will also operate and so will relay "DN," since the windup of these relays are essentially in parallel with the windup of relay 182, through the "down" limit switch 133 which is closed at this moment. Relay 145, due to the opening of contacts 147 and 184 will turn off the green in-traffic light 186. Relay "DN" will now operate main motor 92 through its contacts to bring the plate downward until "down" limit switch 133 opens, at which time relay "DN" and relay 182 will reset and the motor 92 will stop. The green out-traffic light 187 will now light, indicating to the driver that he may proceed to cross the barrier plate to leave the area. Relay 145 is still operated, holding the green out-traffic light 187 lit and keeping light 186 out. The first operation of pulser switch 64 as the car wheel passes over the barrier plate causes relay 144 to operate and, in turn, causes relay 145 to reset, turning off the green out-light 187. The green in-light 186 does not light at this time, since, in the cycle of operations described above, relay 169 will operate immediately after relay 144 and then relay 171 operates, disconnecting power from light 186. Once the car starts to cross the barrier plate to leave the parking area, the relay operation cycle is identical to that described for a car entering the lot. The relay system "counts" the two wheels and causes the plate to be driven upward to its normal position after the second wheel has left the plate.

Although I have herein shown and described one embodiment of the invention and the controls therefor, it is obvious that many changes may be made in the arrangements herein shown and described within the scope of the following claims:

What is claimed is:

1. In a device of the character described, a barrier member comprising a rectangular plate normally inclined, one end being substantially level with the surface of the ground and the other end being sufficiently above the ground to prevent vehicle wheels from passing thereover, said barrier being adapted to be normally positioned in the path of and adapted to be depressed and traversed by the front and rear wheels of vehicles moving in one direction thereover and adapted to have said second end lowered to permit vehicle to move thereover in the opposite direction, a horizontally disposed frame carrying a shaft and bearings supporting said barrier substantially below the level of the upper surface thereof, a casing into which said shaft extends, mechanism in said casing operatively connected to said shaft, a reversible electric motor positioned in said casing and operatively connected to said mechanism, relay means in said casing for controlling said motor, said casing being positioned above the earth level of said barrier member, said mechanism including gear means carrying extension arms movable in predetermined increments, and switching means in cooperative relation to said arms and effecting control of said motor.

2. In a device of the character described, a barrier member to be normally positioned in the path of and adapted to be depressed and traversed by the front and rear wheels of vehicles moving in one direction thereover and adapted to be lowered to permit vehicles to move thereover in the opposite direction, a horizontally disposed frame carrying a shaft and bearings supporting said barrier, a casing into which said shaft extends, mechanism in said casing operatively connected to said shaft, a reversible electric motor positioned in said casing and operatively connected to said mechanism, relay means mounted in a sealed casing for controlling said motor, said mechanism including gear means carrying an extension arm movable in one direction and a second extension arm movable in a different direction, and switching means comprised of one switch in the path of each of said arms for instituting reversals of rotation of said motor.

3. In a device of the character described, a barrier member comprising a rectangular plate normally inclined, one end being substantially level with the surface of the ground and the other end being sufficiently above the ground to prevent vehicle wheels from passing thereover, said barrier being adapted to be normally positioned in the path of and adapted to be depressed and traversed by the front and rear wheels of vehicles moving in one direction thereover and adapted to have said second end lowered to permit vehicles to move thereover in the opposite direction, a horizontally disposed frame carrying a shaft and bearings supporting said barrier substantially below the surface of said frame and the earth in which it is installed, a casing into which said shaft extends, mechanism in said casing operatively connected to said shaft, a reversible electric motor positioned in the upper portion of said casing above the level of the depressible position of said barrier member and operatively connected to said mechanism, relay means enclosed in a second casing for controlling said motor, and pulsing means below said barrier means and actuated by the weight of the wheels of any vehicle passing over said barrier for effecting control of said motor.

4. The invention according to claim 3 in which the relay means has overriding pulsing means so arranged that two pulses cause the motor to move the barrier up from its lowered position.

References Cited in the file of this patent

UNITED STATES PATENTS

| | | |
|---|---|---|
| 2,015,607 | Shinn | Sept. 24, 1935 |
| 2,240,948 | Evans | May 6, 1941 |
| 2,255,911 | Burnison | Sept. 16, 1941 |
| 2,327,366 | Nampa | Aug. 24, 1943 |
| 2,358,747 | Teetor | Sept. 19, 1944 |
| 2,528,790 | Scherer | Nov. 7, 1950 |
| 2,581,788 | Dunn | Jan. 8, 1952 |